United States Patent Office 3,263,346
Patented August 2, 1966

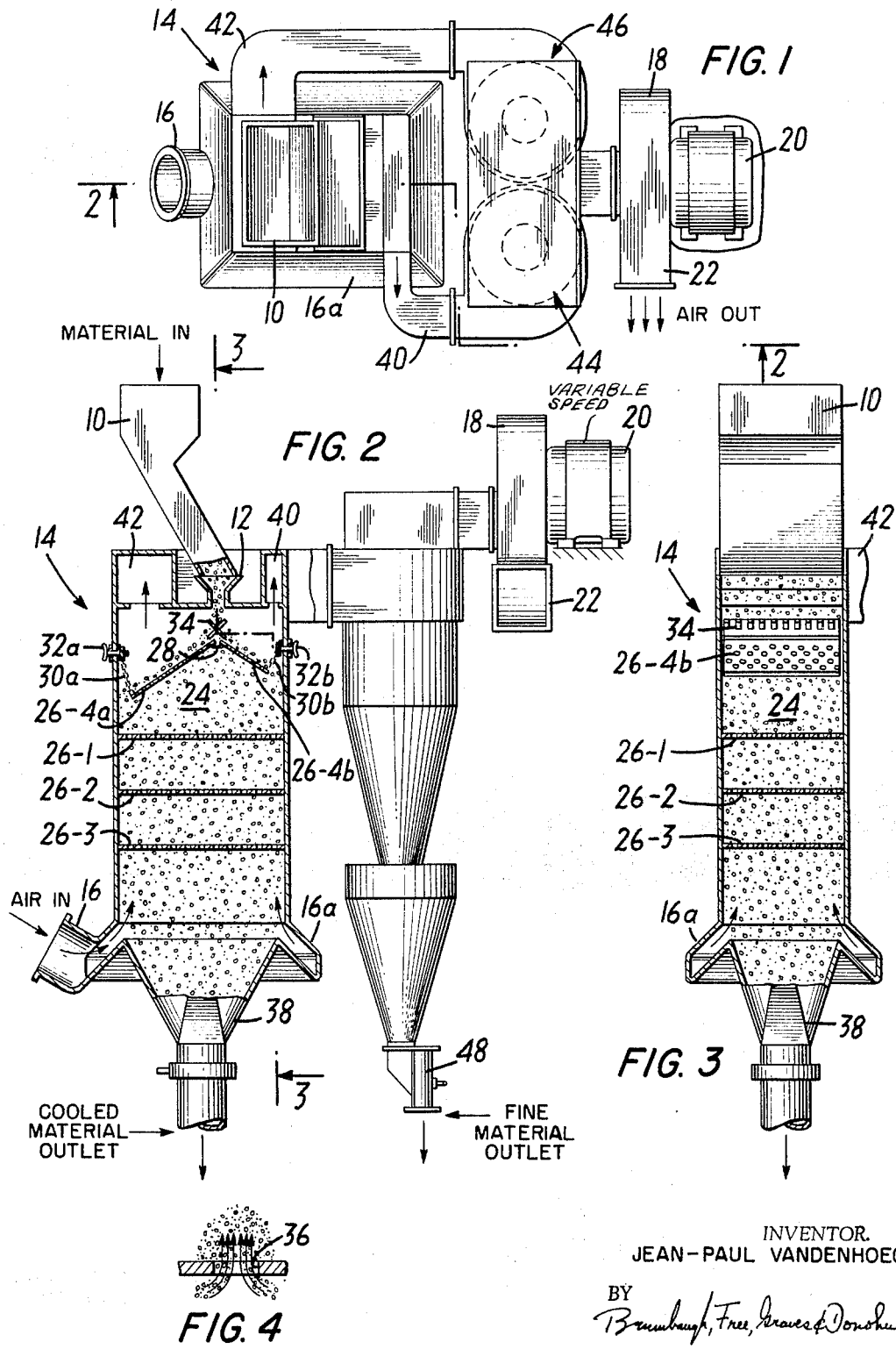

3,263,346
HEAT EXCHANGING METHOD AND APPARATUS
Jean-Paul Vandenhoeck, New York, N.Y., assignor to Buell Engineering Company, Inc., New York, N.Y., a corporation of New York
Filed July 24, 1963, Ser. No. 297,358
13 Claims. (Cl. 34—10)

This invention relates to heat exchanging techniques and, more particularly, to the cooling of particulate material.

The invention finds particular application in the fertilizer industry, where particles of processed fertilizer at a high temperature must be cooled for further processing. At the present time, fertilizer is typically cooled by employing rotary coolers which cause the particles to pass through a cooling gas that absorbs the heat from the particles. Coolers of this type are generally quite inefficient and include such disadvantages as large floor space requirements, high power consumption, cumbersome and massive rotating parts, and difficult clean-out.

The present invention is directed toward a heat exchanging technique, specifically, a cooling technique, wherein the disadvantages of the equipment presently employed are completely avoided. To elaborate, particulate material to be cooled is uniformly introduced into an enclosure above a perforated plate whose perforations are large enough to permit the particulate material to pass therethrough. A gas is passed upwardly through the perforated plate and the enclosure with a flow sufficient to cause a turbulent bed of material to be formed over the plate in the enclosure. The velocity of the gas in the upper portion of the bed is not so great as to cause the material to become entrained in the gas and to pass upwardly out of the enclosure. However, in the bottom portion of the bed adjacent the perforation, the normal downward flow of the particles is reversed due to the jet action or increased velocity of the gas passing through the perforations. Thus, the particles in this section of the bed are accelerated upwardly until the jet action is dissipated and the particles fall downwardly again. Although this action is continuous, the particles gradually pass through the perforations because of temporary interruptions of gas flow through the perforations due to material blockage of the perforations. The material also flows through each of the perforations even with uninterrupted gas flow by passing through the quiescent zone at the periphery of the perforation caused by the contraction of the gas as it is accelerated through the perforation. The turbulent action of the material in the bed causes continuous contact of the material with the gas which transfers heat between the material and the gas, thereby, in the case of particles hotter than the gas, to cool the material. By allowing the material to pass through the perforated plate, elaborate check valve arrangements are completely avoided.

A plurality of perforated plates positioned one above another may be employed to increase the time during which a particle is in contact with the gas and to form a plurality of turbulent beds of material, each of which transfers heat between the gas and the material. The plurality of beds increases the efficiency of the unit, inasmuch as each bed causes heat to be transferred between the gas and the material, and, with sufficient beds, the gas finally leaving the enclosure is at the temperature of the incoming material, thus achieving the maximum transfer of heat. Additionally, an inclined perforated plate may be positioned at the top of the enclosure to aid in the uniform distribution of inflowing material.

The invention described generally above may be more completely understood by reference to the following detailed description, which is to be read in conjunction with the appended drawing in which:

FIG. 1 is a plan view of a particle handling system incorporating the present invention;

FIG. 2 is a partially sectional view of the apparatus shown in FIG. 1, taken generally along the section line 2—2 of that figure and looking in the direction of the arrows;

FIG. 3 is a sectional view of the apparatus shown in FIG. 2, taken generally along the section line 3—3 of that figure and looking in the direction of the arrows; and FIG. 4 is a detailed view of a portion of one of the perforated plates shown in FIG. 2 showing the action of the particles and gas adjacent one of the perforations in the plate.

Referring to FIGS. 1 through 3, material to be cooled is introduced into an inlet hopper 10 which leads to a funnel-shaped receptacle 12 at the top of a cooling arrangement 14 in accordance with the invention. Ambient air, which typically serves as the cooling medium but which may be pre-cooled, if desired, is introduced through an inlet 16. The inlet communicates with a passage 16a to introduce the air peripherally to the cooler 14. A fan 18, driven by a motor 20, whose speed is adjustable, draws air from the passage 16a through the cooler 14, discharging it through an air outlet 22. The fan 18 could just as easily be positioned at the inlet 16 to force air through the cooler, which is advantageous in units for cooling high temperature material in which the incoming air is substantially cooler than that at the air outlet 22.

The cooler 14 comprises an enclosure 24 across which are positioned a plurality of perforated plates 26–1, 26–2, and 26–3. The perforations, which are advantageously circular, are sufficiently large so that the largest particles handled by the apparatus may easily pass therethrough. A further perforated plate, comprising two sections 26–4a and 26–4b, is positioned substantially at the top of the enclosure beneath the funnel-shaped receptacle 12. One end of each of these plate sections pivots generally about an axis 28, the other ends being supported by chains 30a and 30b, respectively, which are coupled respectively to adjusters 32a and 32b which regulate the lengths of the chains. Thus, the perforated plate sections 26–4a and 26–4b are inclined within the enclosure 24, the inclination of each being adjustable.

The material to be cooled passes downwardly from the funnel-shaped receptacle 12 onto a series of inclined plates 34, adjacent plates being inclined in different directions so as to divide the material flowing downwardly into two curtains of material that pass over the perforated plate sections 26–4a and 26–4b.

The material passes downwardly through the perforations in the plate sections 26–4a and 26–4b. In the upper section of the portion of the enclosure 24 between the plate sections 26–4a and 26–4b and the plate 26–1, the upward velocity of the air is insufficient to convey upwardly the average particle of the material handled. Thus, the particles drift downwardly toward the plate 26–1 at a velocity which is less than the settling velocity of a particle with no counter air flow. As the particles approach the plate 26–1, they are subjected to the relatively high velocity jet action of the air passing through the perforations in the plate. The jet velocity is considerably higher than the average particle settling velocity, and accordingly the particles are accelerated upwardly until the jet action of the air is dissipated. This results in the creation of a turbulent bed above the plate.

Because of the spacing of the perforations in the plate 26–1, there are quiescent zones above the plate in which there is litle or no upward air movement. In these zones the particles drift downwardly to the plate where they are again subject to re-entrainment in the gas and flow upwardly or pass through the perforations in the plate. The action of the particles passing through the perforations in the plates is believed to be substantially as depicted in FIG. 4. As shown in that figure, air passes upwardly through an aperture 36 and is contracted toward the center of the aperture, thus allowing particles of material to flow downwardly through the aperture at the sides thereof. If the flow rate through the aperture is not sufficient to accommodate all the particles presenting themselves to the aperture without blocking the aperture, the air flow is temporarily cut off and is transferred to another unblocked aperture. As soon as the air flow stops, the temporarily retained particles are released until blockage is eliminated and the air flow is re-established through the aperture.

The particles of material pass downwardly through the perforated plate 26–1 and into another turbulent bed formed above the plate 26–2 wherein the action described above is repeated. The particles pass through the plate 26–2 into a final turbulent bed above the plate 26–3 and thence through that plate and outwardly through a cooled material outlet 38. The air within the enclosure 224, together with very fine particles of material or dust, passes through outlet conduits 40 and 42 into cyclones 44 and 46 which remove the dust from the air and discharge it through a fine material outlet 48. The relatively clean air passes from the cyclones 44 and 46 to the fan 18 and is discharged through the air outlet 22.

The cooling of the particles of material is dependent upon the amount of time during which the material is retained within the cooler 14. This is determined by the size of the particles, the air velocity, the number of perforated plates positioned within the enclosure 24, and the size and number of the perforations in the plates. The level of each turbulent bed of material above a particular perforated plate is determined by the size of the material, the velocity of the air through the perforations, and the number and size of the perforations.

Because of the use of a plurality of perforated plates, each of which allows a turbulent bed of material to be formed, the material is cooled in what may be considered a step-by-step cooling process, each bed providing a step in the process. If a sufficient number of beds are employed, the cooling gas medium will be heated to the temperature of the inflowing particles by the time it is exhausted, and thus maximum cooling is achieved with a given volume of air. This renders the overall efficiency of the cooler very high, thereby decreasing air requirements for a predetermined amount of cooling and greatly reducing the size of the fan needed and the power absorbed by the system.

In a typical example of the apparatus, the cooler 14 may comprise a rectangular chamber 6' x 7'. The perforated plates 26–1 through 26–3 may be spaced 5' apart, each of the plates containing circular perforations ¾" in diameter, whose area is one-half the area of the plate. The velocity of the air at the inlet 16 may be 700' per minute, with the air temperature at the inlet being 90° F. With a cooler of these dimensions, with particles varying in size from 6 through 14 mesh (3360–1164 microns), with the average particle size being 10 mesh (1651 microns), and with the temperature at the material inlet 10 being approximately 215° F., the particles were cooled so that the temperature at the cooled material outlet 38 was 120° F. The air temperature at the air outlet 22 was 180° F.

It will be noted that the invention involves the forming of one or more turbulent beds of material to cool the material, with the gradual passage of the material through the beds. The use of perforated plates to form the bases of the beds through which the material passes avoids the use of check valves and gas cleaning equipment between stages. Additionally, the action of the particles striking the perforated plates due to air turbulence causes conglomerations of material to break up, thereby preventing bunching and clustering normally encountered. The adjustably positioned perforated plate sections 26–4a and 26–4b, together with the plates 34, provide a useful feature for forming a uniform curtain of material.

It will be appreciated that the embodiment described above is subject to modification. The invention, therefore, should be taken to be defined by the following claims.

I claim:

1. In apparatus for changing the heat content of particulate material, the combination of an enclosure having a perforated base, the perforations in the base being at least large enough to permit the largest particles of the material to readily pass downwardly therethrough, means for introducing the particulate material into the enclosure above the perforated base, means for passing a flowing gas upwardly through the perforated base and through the enclosure, the flow of the gas being sufficient to cause the material above the perforated base to undergo turbulent action while permitting a downward passage of the particulate material through the perforated base, thereby to exchange heat between the particulate material and the gas.

2. Apparatus as recited in claim 1, wherein the perforations in the base are substantially circular.

3. Apparatus as recited in claim 1, wherein the area defined by the perforations in the base is roughly one-half the area of the base.

4. Apparatus as recited in claim 1, wherein the apparatus includes a plurality of perforated plates positioned one above the other in the enclosure, the plates defining a plurality of chambers in each of which the material undergoes turbulent action.

5. Apparatus as recited in claim 4, wherein the uppermost one of said perforated plates is inclined downwardly.

6. Apparatus as recited in claim 5, including means for varying the inclination of said uppermost perforated plate.

7. Apparatus as recited in claim 1, wherein the means for introducing the particulate material into the enclosure includes deflector means for deflecting the particulate material to form a uniform curtain of material substantially at the top of the enclosure.

8. Apparatus as recited in claim 1, wherein the means for passing the flowing gas upwardly through the perforated base and the enclosure passes the gas through the perforations in the base at a velocity which is greater than the settling velocity of substantially the average particle handled by the apparatus.

9. Apparatus as recited in claim 1, including means for varying the velocity of the upwardly flowing gas.

10. In apparatus for cooling particles of granular material, the combination of an enclosure having at least one perforated plate positioned substantially horizontally therein, the perforations in the plate being at least large enough to permit the largest particles of material to readily pass downwardly therethrough, means for supplying the particles of granular material to the enclosure above the perforated plate, means for passing a flowing gas upwardly through the enclosure and through the perforated plate, the velocity of the gas when passing through the perforations in the plate being sufficient to accelerate the particles of granular material upwardly for a limited distance above the plate, the velocity of the gas appreciably above the plate being insufficient to carry the average size particle of material out of the enclosure, and the perforations in the plate being of a size and spacing to permit a downward passage of the material through the perforated plate, thereby to cool the particles of granular material.

11. In a method of exchanging heat between a particulate material and a gas, the steps comprising introducing the material above a perforated plate whose perforations are sufficiently large to permit the material to pass therethrough, and passing a gas upwardly through the plate, the gas flow being sufficient to product turbulent action of the material above the plate yet permitting the downward passage of material through the plate, thereby to exchange heat between the material and the gas.

12. In a method of exchanging heat between a particulate material and a gas, the steps comprising forming a turbulent bed of the particulate material above a perforated member whose perforations are sufficiently large to permit the downward passage of the material through the member, the velocity of the gas when passing through the perforations in the member being sufficient to accelerate the material upwardly above the member, the velocity of the gas a substantial distance above the member being insufficient to carry the majority of the material out of the enclosure, and the air flow above the member and through the perforations in the member allowing the gradual downward passage of material through the member, thereby to exchange heat between the material and the gas.

13. In apparatus for cooling particles of granular material, the combination of an enclosure having a plurality of perforated plates positioned substantially horizontally therein at vertically spaced apart locations, the perforations in the plates being at least large enough to permit the largest particles of the material to readily pass downwardly therethrough, means for supplying the particles of granular material to the enclosure above the uppermost perforated plate, means for passing a flowing gas upwardly through the enclosure and through the perforated plates from below the lowest perforated plate, the velocity of the gas when passing through the perforations in the plate being sufficient to accelerate the particles of granular material upwardly for a limited distance above the plate and being greater than the settling velocity of the average particle of material, the velocity of the gas appreciably above each plate being insufficient to carry the average sized particle of material out of the enclosure, and the perforations in the plate being of a size and spacing to permit a downward passage of the material through the plates, thereby to cool the particles of material as they pass downwardly through the enclosure and are discharged into the space below the lowermost perforated plate.

References Cited by the Examiner
UNITED STATES PATENTS

| | | | |
|---|---|---|---|
| 2,861,353 | 11/1958 | Lellep | 34—20 |
| 2,876,079 | 3/1959 | Upchurch | 34—57 |
| 2,893,849 | 7/1959 | Krebs | 34—10 |

FOREIGN PATENTS

| | | |
|---|---|---|
| 674,935 | 7/1952 | Great Britain. |

WILLIAM J. WYE, *Primary Examiner.*

Disclaimer 3,263,346.—*Jean-Paul Vandenhoeck*, New York, N.Y. HEAT EXCHANGING METHOD AND APPARATUS. Patent dated Aug. 2, 1966. Disclaimer filed Oct. 10, 1975, by the assignee, *Envirotech Corporation*.

Hereby enters this disclaimer to claims 1, 2, 3, 8, 10, 11, 12 and 13 of said patent.

[*Official Gazette March 23, 1976.*]